United States Patent [19]

Arai et al.

[11] Patent Number: 4,771,028

[45] Date of Patent: Sep. 13, 1988

[54] HEAT RESISTANT COMPOSITION AND METHOD OF PRODUCING THE SAME

[75] Inventors: Hiromichi Arai, Fukuoka; Jun Kitagawa, Shimonoseki, both of Japan

[73] Assignee: Catalysts and Chemicals Inc., Tokyo, Japan

[21] Appl. No.: 895,189

[22] Filed: Aug. 11, 1986

[30] Foreign Application Priority Data

Aug. 30, 1985 [JP] Japan .................................. 60-189967
Jun. 18, 1986 [JP] Japan .................................. 61-140287

[51] Int. Cl.$^4$ ...................... B01J 21/04; B01J 23/02
[52] U.S. Cl. ...................................... 502/341; 502/439
[58] Field of Search ............................ 502/340, 341, 439

[56] References Cited

U.S. PATENT DOCUMENTS

| | | | |
|---|---|---|---|
| 2,422,172 | 6/1947 | Smith et al. | 208/135 |
| 2,886,513 | 5/1959 | Baker | 208/121 |
| 3,291,564 | 12/1966 | Kearby | 502/439 X |
| 4,375,571 | 3/1983 | Hart et al. | 502/341 X |
| 4,438,219 | 3/1984 | Brandenburg et al. | 502/341 X |

FOREIGN PATENT DOCUMENTS

| | | |
|---|---|---|
| 0001434 | 4/1979 | European Pat. Off. . |
| 0146927 | 7/1985 | European Pat. Off. . |
| 2431983 | 1/1976 | Fed. Rep. of Germany . |

*Primary Examiner*—W. J. Shine
*Attorney, Agent, or Firm*—Ladas & Parry

[57] ABSTRACT

Excellent heat resistant compositions suitable for catalyst carries or catalysts are provided, which retain specific surface area thereof at high temperatures of not less than about 1200° C. far better than conventional most superior γ-alumina.

15 Claims, 5 Drawing Sheets

FIG_5

HEAT RESISTANT COMPOSITION AND METHOD OF PRODUCING THE SAME

BACKGROUND OF THE INVENTION

1. Field of the Invention

The present invention relates to a heat resistant composition, and more particularly to catalysts and catalyst carriers for use in catalytic reactions such as catalytic combustion, etc., and a method of producing the same.

2. Related Art Statement

Catalysts are commercially used at operating temperatures of, for example, 200°–600° C. in usual petrochemical processes, and at about 750° C. in steam reforming process which uses the highest temperature for the catalysts. Recently, catalytic converters have been used for purifying exhaust gases from automobiles, and the temperature of the converters reaches to about 850° C. at the maximum. Further, catalysts have been interested for use at high temperatures in methanation reaction and catalytic combustion reaction for gas turbines, boilers and jet engines, and are expected in some cases to keep their activity even at high temperatures exceeding 1000° C. Under these circumstances, development of catalysts or catalyst carriers of excellent heat resistant property, i.e., property to keep its high specific surface area even at high temperatures as high as possible, has been earnestly desired.

A catalytic combustion process in which a catalyst promotes reaction between fuel and oxygen has the following many advantages as compared with conventional non-catalytic combustion processes, so that it has attracted attentions.

(1) Complete combustion can be attained even at low temperatures.
(2) Complete and stable combustion can be attained over a wide range of fuel/air ratio.
(3) Generation of thermal NOx is greatly diminished.

In order to establish a technique of catalytic combustion process, it is essential to develop a catalyst which has activity at low temperatures and can keep its activity as high as possible even at high temperatures. For this purpose, many efforts have been made in many places, at present. Because adoption of a heat resistant catalyst carrier is the most effective means for developing heat resistant catalysts, a heat resistant carrier has attracted researchers' especial interests nowadays.

Among the catalyst carriers which has been used commercially, alumina is known to be most heat resistant. γ-Alumina is a carrier which has a specific surface area of about 200 m$^2$/g and keeps high specific surface area of more than about 50 m$^2$/g even when used at about 1000° C. However, if used at 1200° C., it is transited to α-alumina and rapid sintering occurs to decrease its specific surface area to about 5 m$^2$/g or less. If it is used at 1300° C., the specific surface area of the used alumina becomes less than 1 m$^2$/g which has no significance as a catalyst carrier. Thus, in order to improve heat resistant property of alumina at high temperature, many attempts have been made to add a second component to alumina and to make complexes thereof.

It is known to improve catalyst by addition of an alkaline earth metal oxide to a nickel catalyst supported on alumina carrier. For example, Japanese patent application publication No. 44-17,737 describes "it is instructed in specification of British Pat. No. 969,637 that the proportion of the alkaline compound is preferably within the range of 0.75 to 8.6% calculated as metal on the combined weight of metallic nickel and alumina, and is larger than the rate of alumina in the catalyst", "We found that the especially effective catalyst might be obtained when proportion of the alkaline earth metal is higher than that cited in the above mentioned specification", "The alkaline earth metals which can be used are barium, strontium, calcium and magnesium but barium is the most preferable", and "Especially preferable rate of barium metal is 10 to 20 weight % to the aggregated weight of nickel, alumina and barium".

This especially preferable rate of 10–20 wt% of barium metal corresponds to Examples 3, 4 and 5 of the above Japanese publication, and the amounts of barium metal in Examples 3, 4 and 5 are respectively about 30 moles, 44.5 moles and 74 moles when calculated per 100 moles of alumina, so that they are very large. In addition, the purpose of adding the alkaline earth metal compound is not the improvement of its heat resistant property, but is clearly to exhibit an effect of a promoter to prevent formation of carbon on the catalyst surface. Further, use temperature of the catalyst is limited to not over than 600° C., so that it is not directed to improvement of heat resistant property of catalyst at high temperatures of 1200° C. or more as the present invention aims.

In general, as catalyst carriers for catalytic combustion process etc., alumina carriers or other carriers of comparatively large specific surface area have been used, and studied. However, at use conditions of high temperatures exceeding 1100° C., especially exceeding 1200° C., specific surface area of the carriers deteriorates rapidly, so that the carriers have a drawback of decreasing their activity, particularly when used again at low temperatures. Therefore, catalysts or catalyst carriers have been heretofore desired which have a property of retaining their specific surface area as high as possible and are not fragile even at high temperatures. Hereinafter, such property is called as "good heat resistant property".

There were proposed many methods of improving the heat resistant property of catalyst carrier made of alumina. For example, U.S. Pat. No. Re. 30,608, U.S. Pat. No. 4,013,587 and U.S. Pat. No. 4,013,590 proposed an addition of silica to alumina, and Japanese patent application laid-open No. 48-14,600 proposed an addition of rare earth oxide to alumina. However, neither of these methods could prevent the transition of γ-alumina to α-alumina at temperatures exceeding 1200° C., so that the decrease of the activity and fragilization or weakening of catalyst particles were unavoidable.

SUMMARY OF THE INVENTION

Therefore, an object of the present invention is to provide especially superior heat resistant composition consisting mainly of aluminum oxide and metal oxide MeO, which is usable especially as heat resistant catalysts or catalyst carriers, the Me being at least one metal selected from the group consisting of Ba, Ca and Sr.

Another object of the present invention is to provide especially superior heat resistant composition which is especially suitable as catalysts such as a catalyst for catalytic combustion process which exposes the catalyst at high temperatures exceeding 1100° C., or carriers for such catalysts.

A further object of the present invention is to provide a method of producing the good heat resistant composition.

Other objects and advantages of the present invention will be apparent from the ensuing descriptions and claims.

The present invention is a heat resistant composition consisting mainly of aluminum oxide $Al_2O_3$ and metal oxide MeO, which comprises about 3–25 moles, particularly about 5–20 moles, of metal oxide MeO per 100 moles of aluminum oxide, the Me being at least one metal selected from the group consisting of Ba, Ca and Sr.

The method of the present invention produces the heat resistant composition of good heat resistant property by mixing a water soluble or alcohol soluble aluminum compound and a water soluble or alcohol soluble metal Me compound selected from the group consisting of water soluble or alcohol soluble Ba compounds, Ca compounds and Sr compounds in a mole ratio of $Al_2O_3$:MeO = about 100:3–25 in a solvent selected from the group consisting of water and alcohol to form an aqueous or alcoholic solution, forming a coprecipitate product, hydrolysis product or heat decomposition product, removing the solvent from the product, optionally precalcining i.e. prefiring and firing i.e. calcining the product at a temperature of 900° C. or more to produce the heat resistant composition. The coprecipitate product is formed by adding a coprecipitant or coprecipitating agent to the solution, the hydrolysis product is formed from hydrolysis of the solution, and the heat decomposition product is formed by heat decomposition of the gelaneous product.

In a preferred embodiment, the heat resistant composition is produced from a complexed alkoxide or mixed alkoxides of aluminum and the metal Me as raw materials. This alkoxide method can provide the heat resistant composition which is superior to those produced by the solids mixing method i.e. powders mixing method and the coprecipitation process in the aqueous solution, and is far superior to other usual processes including an impregnation process used for production of catalysts or catalyst carriers.

The heat resistant composition of the present invention can comprise a small amount of a third component selected from the group consisting of silica, rare earth metal oxides and alkali metal oxides.

As a starting material for aluminum oxide used as a main component for producing the heat resistant composition of the present invention, it is preferable to use alumina known as transition alumina, when using solids mixing method for producing the heat resistant composition. As transition aluminas, six types of alumina, i.e., chi, kappa, gamma, eta, theta and delta aluminas are known. However, all the types of aluminas per se are unstable, and transit to α-alumina when they are exposed to high temperature, and causes catalyst activity to decrease and catalyst particles fragile. When using a precipitation method for producing the heat resistant composition, aluminum nitrate, aluminum sulfate, sodium aluminate or other water soluble aluminum compounds can be used as a starting material for aluminum oxide.

As a starting material for metal oxide MeO such as barium oxide, which is another main component of the heat resistant composition of the present invention, various kinds of the metal Me compounds can be used. As for barium oxide, various barium compounds such as barium oxide, barium hydroxide, barium carbonate, barium nitrate and barium sulfate, etc. can be used. Hereinafter, though the explanations will be made mainly taking Ba as an example of Me, the same applies to Ca and Sr.

For adding the barium compound to the aluminum oxide, various methods generally used for the preparation of catalysts and catalyst carriers can be used, such as coprecipitation, solids mixing, kneading and impregnation method.

In the alkoxide method which is a preferable method for producing the heat resistant composition of the present invention, various alkoxides of aluminum and barium can be used as starting materials for the aluminum oxide and the barium oxide. As the alkoxides, alkoxide of 1–4 carbon atoms such as methoxide, ethoxide, isopropoxide and buthoxide are preferable. Commercial alkoxides can be used, but those alkoxides produced by using aluminum and/or barium metal and alcohols can also be used.

The content of barium oxide in the heat resistant composition is desirably within a range of about 3–25 moles, particularly about 5–20 moles, to 100 moles of aluminum oxide. Below this range, the influence of addition of barium oxide on heat resistant property is small, while addition of excess amount of barium oxide causes to decrease the heat resistant property of the heat resistant composition.

The heat resistant composition can be used in powder form, and in any shapes such as tablet, ring, sphere, extrusion, honeycomb or other shape general in catalysts and catalyst carriers.

In general, the heat resistant composition are processed to the finished product through intermediate and/or final steps of drying, optimum precalcination and/or firing. The firing step may be effected when using the heat resistant composition in practical use temperature. If the heat resistant composition is used as a catalyst or catalyst carrier, especially for catalytic combustion process, the firing is an important operation step for obtaining the heat resistant or thermally stabilized composition, and effected at a temperature close to the highest temperature of using the product heat resistant composition. For example, when the heat resistant composition is a catalyst carrier for high temperature catalytic combustion process, it is naturally expected that a catalyst using the carrier is exposed to a temperature higher than 1300° C. during its usage in the process. For dealing such situation, the composition is preferably be produced through firing at a temperature of 1300° C. or exceeding 1300° C. At such high firing temperature, alumina component in any compositions other than that of the present invention, such as alumina in γ-alumina carrier, silica-alumina carrier and alumina carriers containing rare earth element, alkali metal or other heat resistant property-improving agent, is transited to α-alumina phase followed by unavoidable remarkable decrease of specific surface area and accompanying decrease of the activity, especially of low temperature activity, of the heat resistant composition.

In producing the heat resistant composition of the present invention, it is usually preferable to effect the firing at 900° C. or temperatures higher than 900° C. If the firing is effected at a high temperature exceeding 1300° C., it is necessary to measure a correspondence relation between firing temperature and specific surface area beforehand, and select suitable firing conditions to obtain suitable range of specific surface area of the composition. For instance, in case of a carrier for a catalytic combustion process, the firing temperature is selected such that the specific surface area is not less than about 2 m²/g.

The heat resistant composition of the present invention is preferably produced by mixing a water soluble aluminum salt and a water soluble barium salt in water in a molar ratio of $Al_2O_3:BaO$ of about 100:3-25 to form an aqueous solution, adding a coprecipitant to the aqueous solution to produce a mixed composition in a form of a precipitate, removing the solvent from the coprecipitate by washing and filtering the coprecipitate or evaporating to dryness, precalcining the coprecipitate at about 200°-500° C., and firing the precalcined coprecipitate at a temperature of about 1200°-1300° C. for about 5-30 hours or a temperature at least at about 1300° C. for about 5-20 hours. In this case, as the water soluble aluminum compound, aluminum nitrate, aluminum sulfate, aluminum chloride, etc. can be used. As the water soluble barium compound, barium nitrate, barium chloride, etc. can be used. As the coprecipitating agent or coprecipitant, sodium hydroxide, sodium carbonate, caustic potash and aqueous ammonia, etc. can be used. As the water soluble starting materials, basic salt such as sodium aluminate and barium hydroxide, etc. can be used. In this case, acidic coprecipitant such as nitric acid or carbonic acid should be used. The precalcination step may be omitted, as the case may be.

In the preferred alkoxide method, formation of the oxides of aluminum and barium from their alkoxides is preferably effected through their hydrolysis reactions, though other process such as thermal decomposition, etc. can be used. It is not necessary that all of these oxides are prepared from the corresponding alkoxides. For example, alumina, barium carbonate, etc. can be added to the decomposition product of the alkoxides. The hydrolysis reaction is preferably effected at about 50°-100° C. than to effect at room temperature. Influence of pH of water added for hydrolysis reaction is not noticeable. But, influence of aging time after addition of water on the specific surface area of the heat resistant composition is quite large. The longer the aging time is, the higher the specific surface area is. Thus, aging time is preferably at least one hour, and more preferably as long as possible, such as 5-10 hours, within the economically permissible extent. The inventors have found out that specific surface area of the heat resistant composition is influenced by an amount of water used in the hydrolysis, and that unexpectedly large specific surface area can be obtained, even when the amount of water used in the hydrolysis is less than the amount of water necessary for hydrolyzing all the amount of existing complexed or mixed alkoxides into hydroxides and alcohols (hereinafter, abbreviated as "equivalent amount of water"). Thus, the amount of water can be less than the equivalent amount of water. However, less than about 0.5 equivalent amount of water is not preferable, because specific surface area of the produced heat resistant composition decreases rapidly. On the other hand, use of an unnecessarily large amount of water in the hydrolysis is not preferable, because it incurs an excessive investment cost and energy consumption, so that water amount is preferably equal to or less than about 10 equivalent amount of water from an economical view point. Therefore, generally amount of water to be used is about 0.5-10 equivalent amount of water. But, the amount of water is not exclusively limited to this range.

In a preferred embodiment of the alkoxide method, the heat resistant composition of the present invention is produced by dissolving aluminum alkoxide and barium alkoxide in a mole ratio of 200 moles of aluminum alkoxide which corresponds to 100 moles of $Al_2O_3$ to about 3-25 moles of barium alkoxide in alcohol to form an alcoholic solution, adding about 0.5-10 equivalent amount of water to the alcoholic solution at a temperature of 50°-100° C. to hydrolyze the alkoxides, aging the hydrolyzed solution for 5-10 hours, removing the solvent by e.g. filtering, evaporation to dryness to obtain a mixture of decomposed products, precalcining the mixture of decomposed products at a temperature of about 200°-500° C., and firing the precalcined mixture at a temperature of not less than about 900° C. for about 5-30 hours. Sometimes, the precalcination step may be omitted, as the case may be.

Increase of the specific surface area of the heat resistant composition by the addition of barium oxide to alumina is considered to be caused by the formation of $BaO.6Al_2O_3$. In case of solids mixing method wherein powdery $Al_2O_3$ and $BaO$ are mixed, $BaO.Al_2O_3$ appears in the mixed composition at a firing temperature of around 1100° C., and $BaO.Al_2O_3$ begins to change to $BaO.6Al_2O_3$ in the mixed composition at a firing temperature of around 1200° C., and the composition transforms completely to a single phase of $BaO.6Al_2O_3$ at 1450° C. After the complete formation of $BaO.6Al_2O_3$, the specific surface area decreases very little, even if the firing temperature rises. Meanwhile, in the case of the alkoxide method, it is considered that $BaO.6Al_2O_3$ can be produced directly, without forming the intermediate $BaO.Al_2O_3$, at a relatively low temperature of about 1200° C., which can prevent alumina from sintering and afford good retention of specific surface area at temperatures higher than 1200° C.

BRIEF DESCRIPTION OF THE DRAWINGS

For a better understanding of the present invention, reference is made to the accompanying drawings, in which.

DESCRIPTION OF THE PREFERRED EMBODIMENTS

Hereinafter, the present invention will be explained in further detail by referring to examples.

EXAMPLE 1 AND REFERENTIAL EXAMPLES 1-9

As starting materials, various two kinds of oxides and/or carbonates selected from oxides and carbonates of each constituting elements of aluminum, zirconium, magnesium, barium, calcium, silicon and chromium, which are usually used as refractory materials, are fed to a ball mill and pulverized and mixed for about 24 hours. Mole ratio of two components oxides in all these mixed materials were set to 9:1. These mixed materials are then fired at 1450° C. for 5 hours in air to obtain catalyst carriers of Example 1 and Reference Examples 1–8. For comparison use, pure alumina carrier are produced by using the same aluminum oxide solely and the same procedure mentioned above to obtain catalyst carrier of Referential Example 9. BET specific surface area of these carriers are measured. The results are shown in the following Table 1. Carrier of Example 1 consisting of alumina and barium oxide has an extremely high specific surface area as compared with that of pure alumina carrier of Referential Example 9, and remarkably higher specific surface area than those of the carriers of Referential Examples 1–8, as well.

TABLE 1

| | Carrier Composition | | Specific surface area | Catalyst T conv (°C.) 90% (°C.) | |
|---|---|---|---|---|---|
| | main component - | sub component | (m$^2$/g) | Co$_3$O$_4$ | MnO$_2$ |
| Example 1 | (Al$_2$O$_3$)$_{0.9}$·(BaO)$_{0.1}$ | | 3.1 | 790 | 840 |
| Referential Example 1 | (Al$_2$O$_3$)$_{0.9}$·(MgO)$_{0.1}$ | | 1.2 | 820 | 850 |
| Referential Example 2 | (Al$_2$O$_3$)$_{0.9}$·(ZrO$_2$)$_{0.1}$ | | 1.0 | 810 | 830 |
| Referential Example 3 | (ZrO$_2$)$_{0.9}$·(MgO)$_{0.1}$ | | 0.3 | 860 | 860 |
| Referential Example 4 | (ZrO$_2$)$_{0.9}$·(CaO)$_{0.1}$ | | 0.9 | 820 | 860 |
| Referential Example 5 | (ZrO$_2$)$_{0.9}$·(Al$_2$O$_3$)$_{0.1}$ | | 0.5 | 845 | 840 |
| Referential Example 6 | (MgO)$_{0.9}$·(Al$_2$O$_3$)$_{0.1}$ | | 1.0 | 820 | 830 |
| Referential Example 7 | (MgO)$_{0.9}$·(SiO$_2$)$_{0.1}$ | | 1.3 | 840 | 850 |
| Referential Example 8 | (MgO)$_{0.9}$·(Cr$_2$O$_3$)$_{0.1}$ | | 1.5 | 825 | 840 |
| Referential Example 9 | Al$_2$O$_3$ | | 1.4 | — | — |

Mole ratio of Al$_2$O$_3$:BaO in the composition (Al$_2$O$_3$)$_{0.9}$(BaO)$_{0.1}$ of Example 1 is about 100:11.1.

USE EXAMPLE 1

The various carriers produced in Example 1 and Referential Examples 1–8 (carrier of Referential Example 9 is omitted) are impregnated in a cobalt acetate or manganese acetate solution and fired at 1300° C. for 10 hours to obtain 18 catalysts. The 18 catalysts are then used individually in a fixed bed flow type reactor of ambient pressure to measure their activities in methane combustion test. The gas used in the test consists of 1 vol% of methane and 99 vol% of air, and was fed to catalyst bed of the reactor at a space velocity of 48000 hr$^{-1}$.

The results of the activities test are also shown in the above Table 1. In Table 1, T conv 90% (°C.) means a temperature at which 90% of methane conversion was achieved. As seen in Table 1, catalysts using carriers of higher specific surface areas have higher activities expressed by T conv 90% (°C.). The catalyst supporting Co$_3$O$_4$ on the carrier of Example 1 consisting of the main component Al$_2$O$_3$ and sub component BaO exhibits extremely higher activity than those of the other catalysts using carriers of Referential Examples 1–8.

EXAMPLES 2–6 AND REFERENTIAL EXAMPLES 10–11

Catalyst carriers are produced in the same manner as in Example 1, except that alumina and barium oxides are used as starting materials. Mole ratios of barium oxide to the sum of barium oxide and alumina in these carriers are, respectively, 0 mol% for Referential Example 10, 5 mol% for Example 2, 10 mol% for Example 3, 14.3 mol% for Example 4, 15 mol% for Example 5, 20 mol% for Example 6, and 50 mol% for Referential Example 11.

Mole ratio of Al$_2$O$_3$:BaO of the carrier of the examples 2–6 is about 100:5.0 for Example 2, about 100:11.1 for Example 3, about 100:16.7 for Example 4, about 100:17.6 for Example 5, and about 100:25.0 for Example 6.

Figure 1:
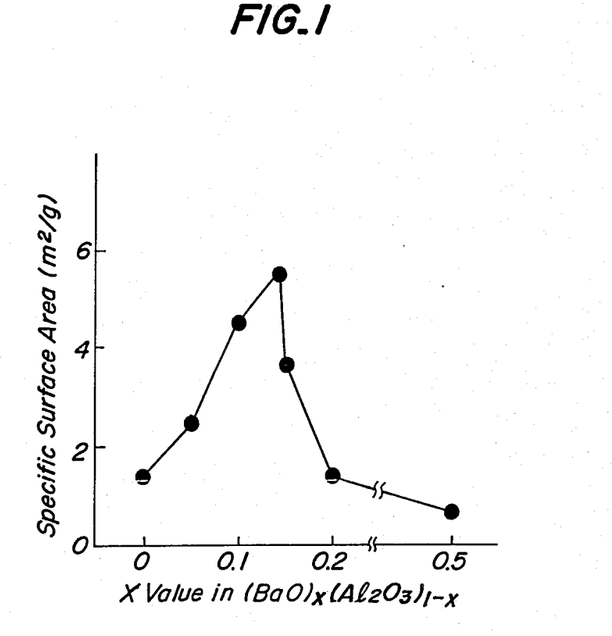
FIG. 1 is a characteristic graph showing a relation between specific surface area of $(BaO)_x(Al_2O_3)_{1-x}$ compositions obtained by firing at 1450° C. for 5 hours and the value of x.

Compositions and specific surface areas of these carriers are shown in the following Table 2 and attached FIG. 1.

TABLE 2

| Carrier | BaO (mol %) | Al$_2$O$_3$ (mol %) | Specific surface area (m$^2$/g) |
|---|---|---|---|
| Referential Example 10 | 0 | 100 | 1.4 |
| Example 2 | 5 | 95 | 2.5 |
| Example 3 | 10 | 90 | 4.5 |
| Example 4 | 14.3 | 85.7 | 5.4 |
| Example 5 | 15 | 85 | 3.7 |
| Example 6 | 20 | 80 | 1.3 |
| Referential Example 11 | 50 | 50 | 0.7 |

X-ray diffraction patterns of the carriers containing 0, 10, 14.3, 15 and 50 mol% of barium oxide are measured. The results are shown in attached FIG. 2. In the FIG. 2, the symbols o means α-Al$_2$O$_3$, ● means BaO.6Al$_2$O$_3$, and the symbol ∇ means BaO.Al$_2$O$_3$.

Figure 2:
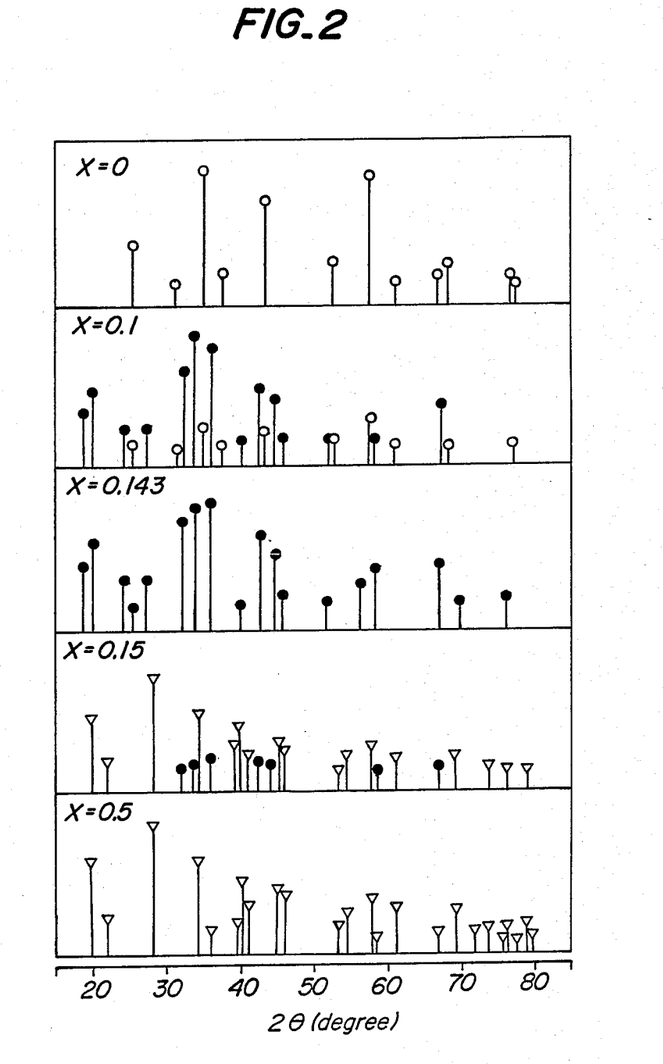
FIG. 2 is X-ray diffraction pattern thereof.

The carrier containing 14.3 mol% of BaO has the maximum specific surface area of 5.4 m$^2$/g, and showed the sole pattern of BaO.6Al$_2$O$_3$ by the X-ray diffraction. The carrier containing 14.3 mol% of BaO exhibiting the maximum specific surface area shows the structure of BaO.6Al$_2$O$_3$ by X-ray diffraction, so that it is considered that the small reduction of the specific surface area of the carrier at high temperature is brought from the formation of the stable BaO.6Al$_2$O$_3$ phase.

As seen from the above Table 2, carriers of Examples 3, 4 and 5 have larger specific surface area than other Examples, so that it is clear that Al$_2$O$_3$:BaO mole ratio of about 100:11.1–17.6 is preferable.

EXAMPLES 7–12 AND REFERENTIAL EXAMPLES 12–16

Figure 3:
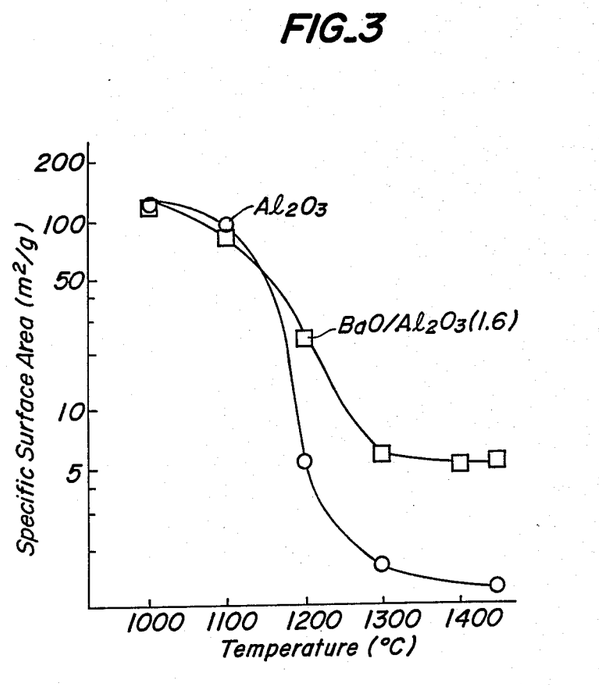
FIG. 3 is a characteristic graph showing a relation between firing temperature and specific surface area of a carrier of $(BaO)_{0.143}(Al_2O_3)_{0.857}$ composition produced by the solids mixing method.

The same starting materials of Al$_2$O$_3$ and BaO as in Example 1 are pulverized and mixed as in Example 1 to produce unfired mixtures of (Al$_2$O$_3$)$_{0.857}$(BaO)$_{0.143}$. The unfired mixtures and referential γ-alumina not containing BaO are respectively fired at 1000° C., 1100° C., 1200° C., 1300° C., 1400° C. and 1450° C. for 5 hours to obtain carriers of Examples 7–12 and Referential Examples 12–16. BET specific surface area of the carriers are shown in the following Table 3 and attached FIG. 3.

TABLE 3

| | Firing temperature (°C.) | Specific surface area (m$^2$/g) |
|---|---|---|
| Example 7 | 1000 | 125 |
| Example 8 | 1100 | 89 |
| Example 9 | 1200 | 24 |
| Example 10 | 1300 | 6 |
| Example 11 | 1400 | 5.3 |
| Example 12 | 1450 | 5.4 |

TABLE 3-continued

|  | Firing temperature (°C.) | Specific surface area (m²/g) |
|---|---|---|
| Referential Example 12 | 1000 | 126 |
| Referential Example 13 | 1100 | 102 |
| Referential Example 14 | 1200 | 5.5 |
| Referential Example 15 | 1300 | 1.7 |
| Referential Example 16 | 1450 | 1.3 |

Figure 4:
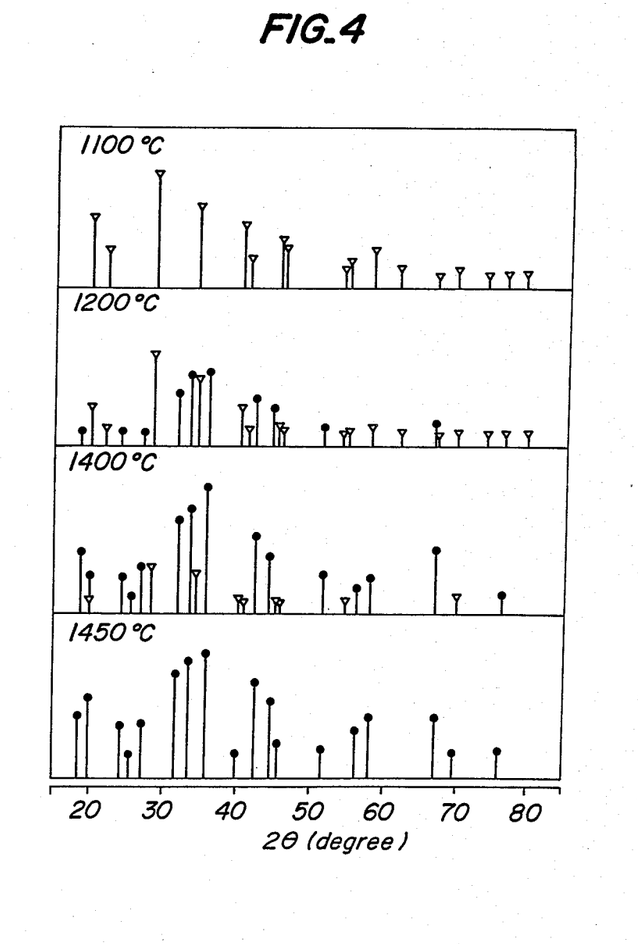
FIG. 4 is X-ray diffraction patterns of some carriers of FIG. 3.

Crystal structures of the carriers of Examples 8, 9, 11 and 12 respectively fired at 1100° C., 1200° C., 1400° C. and 1450° C. are analyzed by X-ray diffraction thereof. The results are shown in attached FIG. 4. In FIG. 4, the symbols ● and ▽ means the same ones as in FIG. 2, i.e., $BaO.6Al_2O_3$ and $BaO.Al_2O_3$, respectively. As seen from FIG. 4, it is considered that the firing of the unfired mixtures at a temperature of not less than 1200° C. has produced high temperature resistant compositions comprising the formed $BaO.6Al_2O_3$, so that sintering of the carries has been suppressed or decreased to the minimum.

EXAMPLE 13

Aluminum nitrate and barium nitrate are solved in water in an $Al_2O_3$:BaO mol ratio of 85.7:14.3 to prepare an aqueous solution, and sodium carbonate is added to the solution to adjust pH thereof to 8 to form coprecipitates.

Thus obtained coprecipitates are washed, filtered, dried at 200° C. for 2 hours, precalcined at 500° C. for 2 hours, and thereafter fired at 1450° C. for 5 hours to obtain a carrier of Example 13.

BET specific surface area of the carrier was 5.5 m²/g.

EXAMPLES 14–16

Aluminum nitrate and nitrate of Me (Me is Ba, Ca or Sr) are solved in water in a mole ratio of $Al_2O_3$:MeO of 85.7:14.3 to prepare an aqueous solutions thereof. The solutions are added with dropwise of aqueous ammonia to a pH of 8, and evaprated to dryness to form coprecipitation products. The formed products are dried at 200° C. for 2 hours, precalcined at 500° C. for 2 hours, and then fired at 1450° C. for 5 hours to obtain carriers of Examples 14, 15 and 16.

BET specific surface area of these carriers are shown in Table 4.

TABLE 4

|  | Composition | Specific surface area (m²/g) |
|---|---|---|
| Example 14 | $(BaO)_{14.3}(Al_2O_3)_{85.7}$ | 5.2 |
| Example 15 | $(CaO)_{14.3}(Al_2O_3)_{85.7}$ | 5.0 |
| Example 16 | $(SrO)_{14.3}(Al_2O_3)_{85.7}$ | 4.2 |

As seen from above Table 4, the addition of calcium oxide or strontium oxide to alumina also brought about retention of high specific surface area of the carriers at high temperatures.

EXAMPLES 17–18 AND REFERENTIAL EXAMPLE 17

Barium isopropoxide and aluminum isopropoxide are dissolved in isopropyl alcohol in a mole ratio of 1:12 to prepare an alcoholic solutions. The solutions are added with dropwise of water to effect hydrolysis thereof. The hydrolysis of the isopropoxides are carried out at a temperature of 80° C., in nitrogen atmosphere. Thus obtained suspension liquids are aged for 12 hours under agitation and then dried in reduced pressure to obtain unfired powders of Example 17.

Meanwhile, barium carbonate $BaCO_3$ and γ-alumina in a mol ratio of 1:6 are pulverized and mixed in a ball mill for 24 hours to obtain unfired powders of Example 18. Thus obtained two types of powders and γ-alumina powder (Referential Example 17) are fired at 1000°, 1100°, 1200°, 1300° 1450° and 1600° C. respectively for 5 hours. BET specific surface area of these fired powders are measured, and the results are shown in the Table 5 below.

TABLE 5

|  | Specific surface area (m²/g) | | | | | |
|---|---|---|---|---|---|---|
|  | 1000° C. | 1100° C. | 1200° C. | 1300° C. | 1450° C. | 1600° C. |
| Example 17 | 79 | 60 | 38 | 18 | 12 | 11 |
| Example 18 | 125 | 90 | 23 | 6 | 5 | 4 |
| Referential Example 17 | 126 | 100 | 5 | 1.7 | 1.2 | 1.0 |

As seen from above Table 5, specific surface area of γ-alumina (Referential Example 17) decreased noticeably at around 1200° C., and became about 1 m²/g at the temperatures above 1400° C. The decrease of the specific surface area is caused by the phase transition of γ-alumina to α-alumina. Thus, this type of alumina is not suitable for a catalyst or catalyst carrier which is used at high temperatures. In case of the powders of Example 18 obtained by the solids mixing method, specific surface area of the powders started to decrease much at 1200° C., but the specific surface area of 5 m²/g was kept even at 1400° C., and this is about 4 times higher than that of Referential Example 17. In case of the powders of Example 17 obtained by the alkoxide method, retention of the specific surface area is further improved, and is always about 2–3 times higher than that of Example 18. It kept high specific surface area of more than 10 m²/g even after it was fired at 1600° C. Thus, adoption of the alkoxide method undoubtedly brings about marked improvement of the specific surface area of the catalyst carrier or catalyst.

Figure 5:
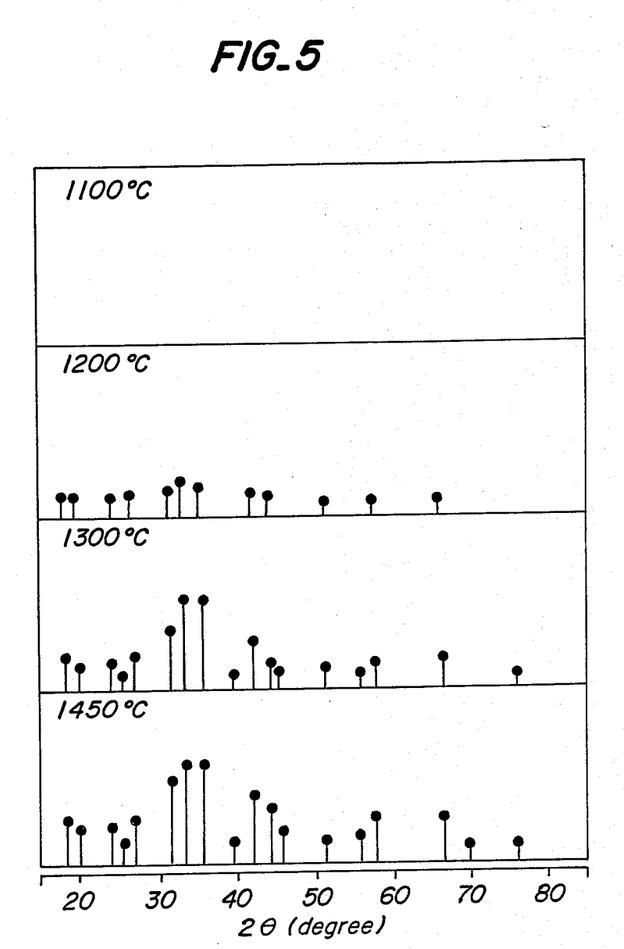
FIG. 5 is X-ray diffraction patterns of $(BaO)_{0.143}(Al_2O_3)_{0.857}$ produced by the alkoxide method and firing at various temperatures of 1000°, 1200°, 1450° and 1600° C.

X-ray diffraction patterns of the fired powders of Example 17 are measured, and the results are shown in FIG. 5. In FIG. 5, the symbol ● means $BaO.6Al_2O_3$.

The alkoxide method enables direct formation of aimed $BaO.6Al_2O_3$ at temperatures of 1200° C. or higher without forming the intermediate $BaO.Al_2O_3$. The directly formed $BaO.6Al_2O_3$ appears to function to suppress the decrease of the specific surface area at 1200° C. or temperatures higher than 1200° C. In addition, the alkoxide method allows treatment of complexed oxides at low temperatures, and this is considered as a reason of affording the more stabilized high specific surface area of the products obtained from alkoxides.

EXAMPLES 19–28

By using the same isopropoxides as in Example 17, various powders of Examples 19–28 are produced. Conditions for hydrolysis of isopropoxides and specific surface area of the powders after fired at 1300° C. or 1450° C. are shown in the following Table 6.

TABLE 6

| | Conditions for hydrolysis | | | Specific surface area (m²/g) | |
|---|---|---|---|---|---|
| | H₂O/MOPr | pH | Aging time (hr) | 1300° C. | 1450° C. |
| Example 19 | 10 | 7 | 0.5 | 10.8 | 8.8 |
| Example 20 | 10 | 7 | 1.0 | 12.5 | 10.2 |
| Example 21 | 10 | 2 | 1.0 | 11.8 | — |
| Example 22 | 10 | 7 | 2.0 | 16.4 | 11.2 |
| Example 23 | 10 | 7 | 12.0 | 18.5 | 12.5 |
| Example 24 | 10 | 7 | 24.0 | 18.3 | 13.4 |
| Example 25 | 2 | 7 | 12.0 | 15.5 | — |
| Example 26 | 1 | 7 | 12.0 | 16.2 | 13.2 |
| Example 27 | 0.75 | 7 | 12.0 | 17.9 | 13.7 |
| Example 28 | 0.5 | 7 | 12.0 | 20.2 | 12.7 |

Note:
1. The ratio H₂O/MOPr expresses a ratio of actual amount of water used for hydrolysis to the equivalent amount of water. (equivalent ratio).
2. pH values of water added were adjusted by addition of dilute nitric acid solution to the water.

Among the hydrolysis conditions, aging time influences largely on the specific surface area. The longer the aging time is, the larger the specific surface area is. The aging time is preferably at least 1 hour, and more preferably at least 5 hours. Influence of pH of the water was not observed. In H₂O/MOPr ratio range of 0.5–10, a tendency was observed that the products obtained from smaller H₂O/MOPr ratios have higher specific surface areas when fired at 1300° C. But, this tendency was hardly seen on the products obtained by firing at 1450° C.

USE EXAMPLE 2

By using the powders of Examples of 23 and 18 obtained by firing at 1450° C., heat durability tests are conducted at the temperature of 1450° C. Test result are shown in the following Table 7.

TABLE 7

| | Producing method | Specific surface area (m²/g) Testing time | | | | |
|---|---|---|---|---|---|---|
| Example | | 0 | 15 hrs | 25 hrs | 40 hrs | 50 hrs |
| 23 | alkoxide method | 12.5 | 12.0 | 10.5 | 10.0 | 9.6 |
| 18 | solids mixing method | 5.3 | 5.0 | 4.6 | 4.1 | 3.5 |

Reduction rate of the specific surface areas after the durability test of firing at 1450° C. for 50 hours are 23% for the product of Example 23 produced by alkoxide method, and 34% for the product of Example 18 which has the same composition with that of Example 23 but produced by solids mixing method, so that the heat resistant property of the product produced from the alkoxide method was far superior to the product produced by the solids mixing method.

EXAMPLES 29–31 AND REFERENTIAL EXAMPLE 18

Four kinds of powders, i.e., the powders of Example 23 obtained by firing at 1300° C., the powders of Example 22 obtained by firing at 1450° C., the powders of Example 18 obtained by firing at 1450° C., and γ-alumina powders fired at 1450° C., are respectively suspended in cobalt nitrate solutions, and evaporated to dryness to obtain dry powders. The dry powders are fired at 1300° C. to obtain four catalysts of Examples 29, 30 and 31 and Referential Example 18. Amount of cobalt oxide supported on each carrier is 10 wt%. Then, these catalysts are used individually in the same activity test as described in Use Example 1 to measure their activities. The results are shown in the following Table 8.

TABLE 8

| Catalyst | Production method | Carrier Composition | Specific surface area (m²/g) | T conv Y % (°C.) | | | |
|---|---|---|---|---|---|---|---|
| | | | | Y = 20% | Y = 50% | Y = 90% | Y = 100% |
| Example 29 | alkoxide method | BaO.6Al₂O₃ | 18.5 | 688 | 706 | 712 | 718 |
| Example 30 | alkoxide method | BaO.6Al₂O₃ | 11.2 | 711 | 739 | 749 | 750 |
| Example 31 | solids mixing method | BaO.6Al₂O₃ | 6.0 | 724 | 745 | 769 | 785 |
| Referential Example 18 | — | Al₂O₃ | 1.4 | 753 | 779 | 800 | 825 |
| None | — | — | — | 817 | 840 | 874 | 900 |

Note:
T conv Y % (°C.) is a temperature at which methane conversion rate is Y %, listed in Table 8.

On every catalyst tested, only carbon dioxide and water are produced. The activity of the catalysts increased with the rise of the reaction temperature. Activity of the catalysts is clearly influenced by specific surface area of the catalyst carriers. The maximum activity is obtained by the catalyst carrier of composition of BaO.6Al₂O₃ which was produced by the alkoxide method. It is noted that the high specific surface area of carrier always brings about high oxidation activities.

EXAMPLES 32–37

356.8 g of commercial aluminum isopropoxide and 20 g of metal barium are dissolved in 600 cc of isopropanol in a nitrogen atmosphere to form a solution. 1200 cc of water of pH 7 is added dropwise into this solution and hydrolyzed the isopropoxide. After addition of the water, pH of the solution is 9. After 12 hours of aging, the resulted suspension is filtered to remove the solvent. Filtered suspension particles are dried at 400° C., pulverized, formed into tablets of a diameter of ¼" and a height of ¼", and fired at 1300° C. for 10 hours to obtain catalyst carrier of Example 32 weighing 111.4 g.

By repeating this procedure of Example 32, five catalyst carriers of Examples 33–37 are produced. However, in producing these five carriers, some of the preparation conditions, such as temperature for hydrolysis reaction, H₂O/MOPr ratio, aging time, firing time, etc. were changed to study the influences thereof over the specific surface area.

Preparation conditions and the obtained specific surface area of the catalyst carriers are shown in the following Table 9.

TABLE 9

| Operating conditions | Example | | | | | |
|---|---|---|---|---|---|---|
| | 32 | 33 | 34 | 35 | 36 | 37 |
| Hydrolysis temperature (°C.) | room temp. | 80 | 50 | 80 | 80 | 50 |
| $H_2$/MOPr ratio | 11 | 11 | 10 | 10 | 10 | 25 |
| Aging time (hour) | 12 | 3 | 17 | 17 | 17 | 17 |
| pH of solution after added with water | 9 | 9 | 9 | 9 | 6 | 9 |
| Firing temperature (°C.) | 1300 | 1300 | 1300 | 1300 | 1300 | 1300 |
| Firing time (hour) | 10 | 10 | 5 | 5 | 5 | 5 |
| Specific surface area | 8.6 | 7.7 | 11.7 | 15.8 | 16.1 | 16.9 |

From these test results, the following matters are clear:
(1) The longer aging time is better.
(2) The higher hydrolysis temperature is better.
(3) The higher $H_2O$/MOPr ratio is better. However, from economical viewpoints of investment cost and energy consumption etc., this ratio should not be excessively high.
(4) There is seen no influence of pH of water added for hydrolysis.

EXAMPLES 38–41 AND REFERENTIAL EXAMPLES 19–20

With the exception that the mole ratio of barium isopropoxide to aluminum isopropoxide was changed, the same production procedures as in Examples 17 and 26 are repeated to prepare several unfired powders, and the powders are fired at 1450° C. for 5 hours to obtain fired powders of Examples 38–41 and Referential Examples 19 and 20. Composition and BET specific surface area of the fired powders are shown in the following Table 10.

TABLE 10

| | Composition | | Specific surface area (m²/g) |
|---|---|---|---|
| | BaO (mol %) | $Al_2O_3$ (mol %) | |
| Referential Example 19 | 0 | 100 | 1.5 |
| Example 38 | 5 | 95 | 5.5 |
| Example 39 | 10 | 90 | 9.7 |
| Example 40 | 14.3 | 85.7 | 13.2 |
| Example 41 | 20 | 80 | 4.5 |
| Referential Example 20 | 50 | 50 | 1.0 |

EXAMPLES 42–44

Aluminum isopropoxide and an isopropoxide of metal Me such as barium isopropoxide, calcium isopropoxide or strontium isopropoxide are mixed in an $Al_2O_3$:MeO mole ratio of 85.7:14.3 in isopropyl alcohol, and the same procedures as in Example 40 are repeated to prepare the fired powders of Examples 42–44. BET specific surface areas of these fired powders are measured. The results are shown in the following Table 11.

TABLE 11

| Example | Composition | Specific surface area (m²/g) |
|---|---|---|
| 42 | $BaO.6Al_2O_3$ | 13.8 |
| 43 | $CaO.6Al_2O_3$ | 12.5 |
| 44 | $SrO.6Al_2O_3$ | 12.3 |

EXAMPLE 45

Aluminum isopropoxide and metal barium in an $Al_2O_3$:BaO mol ratio of 85.7:14.3 are dissolved in ethanol, and reacted at about 70° C. for 5 hours, while bubbling the solution with dry nitrogen gas. The resultant solution is dried under reduced pressure to obtain white transparent gel. Then, the gel is precalcined in air at 800° C. for 5 hours, and fired at 1300° C. for 5 hours to obtain the fired powders of Example 45. Specific surface area of the fired powders of Example 45 is 17.0 m²/g. From this, it is understood that a heat resistant composition of a high specific surface area which is substantially the same with those obtained by the alkoxide method can be obtained also by heat decomposition of the alkoxide.

As described in detail in the foregoing, according to the present invention, remarkably heat resistant composition of always higher specific surface area than that of conventionally most superior alumina at high temperatures can be obtained, which is exceedingly suited to catalysts and catalyst carriers. Therefore, the present invention is eminently useful for industries.

Though the present invention has been described with specific examples and numeral values, it is of course apparent to those skilled in the art that various changes and modifications thereof are possible without departing from the broad spirit and aspect of the present invention as hereinafter claimed.

What is claimed is:

1. In a method of producing a heat resistant composition consisting essentially of aluminum oxide $Al_2O_3$ and at least one metal oxide MeO, the Me being selected from the group consisting of Ba, Ca and Sr, the improvement comprising, dissolving and mixing an alcohol soluble aluminum alkoxide and an alcohol soluble metal Me alkoxide in an alcohol in an $Al_2O_3$:MeO mole ratio of about 100:11.1–25 to form a solution of complexed alkoxides and/or mixed alkoxides, forming a product in the solution by heat decomposition or hydrolysis, separating the product from the solution, and firing the product at a temperature of not less than 900° C., whereby a heat resistant composition comprising about 11.1–25 moles of MeO per 100 moles of alumina in the form of $MeO.6Al_2O_3$ is obtained.

2. A method as defined in claim 1, wherein the alkoxide is decomposed by hydrolysis.

3. A method as defined in claim 1, wherein the alkoxide is decomposed by heat decomposition.

4. A method as defined in claim 1, wherein the alkoxide has 1–4 carbon atoms.

5. A method as defined in claim 2, wherein the amount of water used for hydrolysis is at least about 0.5 equivalent amount of water.

6. A method as defined in claim 2, wherein the hydrolysis is effected at a temperature of about 50°–100° C.

7. A method as defined in claim 2, wherein aging is effected for at least about one hour after the addition of water for hydrolysis.

8. A method as defined in claim 1, wherein Me is barium, and the Al$_2$O$_3$:BaO mole ratio is about 100:11.1–17.6.

9. A heat resistant composition consisting essentially of aluminum oxide Al$_2$O$_3$ and at least one metal oxide MeO, the Me being selected from the group consisting of Ba, Ca and Sr, said composition being prepared by dissolving and mixing an alcohol soluble aluminum alkoxide and an alcohol soluble metal Me alkoxide in an alcohol in an Al$_2$O$_3$:MeO mole ratio of about 100:11.1–25 to form a solution of complexed alkoxides and/or mixed alkoxides, forming a product in the solution by heat decomposition or hydrolysis, separating the product from the solution, and firing the product at a temperature of not less than 900° C., wherein said heat resistant composition comprises about 11.1–25 moles of MeO per 100 moles of alumina in the form of MeO.6Al$_2$O$_3$.

10. The composition, as in claim 9 wherein the alkoxide is decomposed by hydrolysis.

11. The composition, as in claim 9 wherein the alkoxide has 1–4 carbon atoms.

12. The composition, as in claim 10 wherein the amount of water used for hydrolysis is at least about 0.5 equivalent amount of water.

13. The composition, as in claim 10 wherein the hydrolysis is effected at a temperature of about 50°–100° C.

14. The composition, as in claim 10 wherein aging is effected for at least about one hour after the addition of water for hydrolysis.

15. The composition, as in claim 9 wherein Me is barium, and the Al$_2$O$_3$:BaO mole ratio is about 100:11.1–17.6.

* * * * *